US011951486B2

(12) United States Patent
Piotrowski et al.

(10) Patent No.: US 11,951,486 B2
(45) Date of Patent: Apr. 9, 2024

(54) SYSTEM, METHOD, AND APPARATUS FOR PROCESSING FIBER MATERIALS

(71) Applicant: CERTAINTEED CORPORATION, Malvern, PA (US)

(72) Inventors: Tony S. Piotrowski, Winter Haven, FL (US); Jack D. Coulter, Winter Haven, FL (US); Bruce A. Hartzell, Mickleton, NJ (US)

(73) Assignee: CERTAINTEED LLC, Malvern, PA (US)

( * ) Notice: Subject to any disclaimer, the term of this patent is extended or adjusted under 35 U.S.C. 154(b) by 171 days.

(21) Appl. No.: 16/796,216

(22) Filed: Feb. 20, 2020

(65) Prior Publication Data

US 2020/0188927 A1 Jun. 18, 2020

Related U.S. Application Data

(60) Continuation of application No. 15/420,920, filed on Jan. 31, 2017, now Pat. No. 10,603,672, which is a (Continued)

(51) Int. Cl.
*B02C 19/22* (2006.01)
*B01F 27/1121* (2022.01)
(Continued)

(52) U.S. Cl.
CPC .......... *B02C 19/22* (2013.01); *B01F 27/1121* (2022.01); *B02C 18/06* (2013.01); *B02C 23/20* (2013.01); *E04F 21/085* (2013.01)

(58) Field of Classification Search
CPC .......... B01F 7/002–00291; B02C 19/22; E04F 21/085
See application file for complete search history.

(56) References Cited

U.S. PATENT DOCUMENTS

| | | | | | |
|---|---|---|---|---|---|
| 1,202,088 | A * | 10/1916 | Murray | B65G 53/08 406/61 |
| 1,478,395 | A * | 12/1923 | Pierce | F23K 3/04 406/56 |

(Continued)

OTHER PUBLICATIONS

Martin Sprocket & Gear, Inc. Catalog 2001, CEMA Standards, 2 pages.

*Primary Examiner* — Sean M Michalski
(74) *Attorney, Agent, or Firm* — Abel Schillinger, LLP; Thomas H. Osborn

(57) ABSTRACT

A system for processing material has a power supply and a machine having a hopper for receiving and passing material to an auger. The auger has a shaft with an axis about which it rotates, a helical flighting mounted to the shaft, pins mounted to the helical flighting, and paddles mounted to the shaft. The radial outer edge of the helical flighting is crenelated with periodic notches that form rectangular blades on the helical flighting. The pins are rotationally and angularly aligned with leading edges of the rectangular blades. The system may include a vehicle, such as a trailer, having first and second compartments separated by a partition. The power supply is located in the first compartment and has a power supply member extending though the partition. The machine is located in the second compartment and coupled to the power supply member.

17 Claims, 12 Drawing Sheets

Related U.S. Application Data division of application No. 14/023,732, filed on Sep. 11, 2013, now Pat. No. 9,592,482, which is a division of application No. 12/981,657, filed on Dec. 30, 2010, now Pat. No. 8,556,200.

(60) Provisional application No. 61/304,543, filed on Feb. 15, 2010.

(51) Int. Cl.

| | |
|---|---|
| ***B02C 18/06*** | (2006.01) |
| ***B02C 23/20*** | (2006.01) |
| ***E04F 21/08*** | (2006.01) |

(56) References Cited

U.S. PATENT DOCUMENTS 1,916,192 A * 7/1933 Anctil ................. B01F 27/192 241/292.1
2,217,258 A * 10/1940 Ruddell ................. E21B 11/00 175/391
2,337,108 A * 12/1943 Jensen ................. E01H 5/098 37/232
2,571,300 A * 10/1951 Offenhauser ....... B01F 27/1145 241/101.8
3,021,121 A * 2/1962 Moss ................. B01F 27/23 366/184
3,071,352 A * 1/1963 McIntyre ............. B01F 27/706 366/300
3,094,178 A * 6/1963 Newbold ............... E21B 10/44 175/388
3,148,917 A * 9/1964 Thompson ............. E01H 5/094 172/111
3,175,866 A * 3/1965 Nichol ................. E04F 21/12 406/99
3,254,777 A * 6/1966 Vandusen ........... A01F 25/2009 414/322
3,529,870 A * 9/1970 Woten ................. E04F 21/12 406/135
3,638,920 A * 2/1972 Davis ................. B01F 33/502 366/300
3,672,640 A * 6/1972 Crose ................. A01K 5/0216 366/300
3,765,547 A * 10/1973 Shivvers ............... F26B 9/085 198/597
3,787,161 A * 1/1974 Frye ................. B29B 9/00 425/222
3,861,599 A * 1/1975 Waggoner ............. B05B 7/1409 406/135
3,899,066 A * 8/1975 Bedwell ............... A01C 23/003 239/651
3,968,998 A * 7/1976 Wolf ................. A01F 25/20 406/114
RE29,356 E * 8/1977 Bennett ................. E01H 5/094 299/25
4,092,004 A * 5/1978 Leverenz ............... B02C 13/00 241/101.8
4,182,592 A * 1/1980 Henryson ........... B65B 69/0008 414/412
4,186,968 A * 2/1980 Barton ................. B28D 1/18 404/90
4,199,280 A * 4/1980 Allen ................. E04F 21/085 406/56
4,236,654 A * 12/1980 Mello ................. B05B 7/1409 222/630
4,298,289 A * 11/1981 Walley ................. B01F 33/502 241/101.8
4,330,091 A * 5/1982 Rozeboom .......... B01F 27/0541 241/101.8
4,337,902 A * 7/1982 Markham ............. B02C 13/288 406/48
4,344,580 A * 8/1982 Hoshall ................. B65G 65/46 366/322
4,465,239 A * 8/1984 Woten ................. B65G 53/46 406/64
4,506,990 A * 3/1985 Neier ................. B01F 33/502 366/322
4,534,886 A * 8/1985 Kraus ................. D04H 1/4334 252/502
4,580,902 A * 4/1986 Dunstan ................ B28C 9/0418 366/40
4,921,176 A * 5/1990 Kunisada ................ B02C 19/22 241/260.1
5,088,968 A * 2/1992 Horii ................. F16H 37/046 475/140
5,123,186 A * 6/1992 Matushita ................ E01H 5/04 37/251
5,199,638 A * 4/1993 Fischer ................. A01C 3/063 239/7
5,279,467 A * 1/1994 Lydy ................. B02C 13/28 241/101.78
5,279,501 A * 1/1994 Shelley ................. E01C 19/405 198/665
5,327,947 A * 7/1994 McGregor ............ B65D 88/68 141/73
5,381,971 A * 1/1995 Rehmer ................. B02C 13/04 241/88.4
5,398,432 A * 3/1995 Vohl ................. E01H 5/098 37/249
5,402,950 A * 4/1995 Blair ................. B02C 19/22 241/101.76
5,403,128 A * 4/1995 Thomas ................ E04F 21/085 406/52
5,433,577 A 7/1995 Roycraft
5,443,588 A * 8/1995 Loppoli ................ A01C 3/063 366/85
5,462,238 A * 10/1995 Smith ................ B02C 18/2283 241/292.1
5,590,984 A * 1/1997 Assarsson .............. E04F 21/12 406/122
5,601,239 A * 2/1997 Smith ................. B02C 19/22 241/294
5,622,323 A * 4/1997 Krueger ............. B01F 33/5023 241/101.76
5,651,941 A * 7/1997 Stark ................. G01N 35/04 422/562
5,732,892 A * 3/1998 Neier ................. B02C 19/22 241/101.8
5,743,639 A * 4/1998 Puerner ................. B01F 35/71 366/150.1
5,813,152 A * 9/1998 Weight ................. E01H 5/12 37/249
5,829,649 A * 11/1998 Horton ................. B02C 13/288 406/135
5,934,581 A * 8/1999 Chiappa ................. A23G 1/10 241/260.1
5,967,657 A * 10/1999 West ................. A01K 5/002 366/195
6,000,649 A * 12/1999 Loppoli ................. B01F 27/60 241/260.1
6,007,008 A * 12/1999 Neier ................. B01F 27/05 241/101.8
6,088,968 A * 7/2000 Williston, Jr. .......... E04F 21/12 241/101.76
6,161,784 A * 12/2000 Horton ................. A01C 15/007 239/650
6,199,306 B1 * 3/2001 Kauppila ................ E01H 5/098 37/249
6,203,185 B1 * 3/2001 Neier ................. B01F 33/5023 241/101.76
6,260,293 B1 * 7/2001 Monroe ................. E01H 5/045 37/244
6,273,350 B1 8/2001 Kirby et al.
6,328,465 B1 * 12/2001 Tamminga ............ B01F 33/502 241/261.1
6,588,691 B2 * 7/2003 Yamamoto ................ B65F 3/08 241/101.741
6,668,534 B2 12/2003 Sheedy et al.

(56) References Cited

U.S. PATENT DOCUMENTS

| | | | | |
|---|---|---|---|---|
| 6,732,960 | B2 * | 5/2004 | Shaw | E04F 21/085 239/690 |
| 6,796,748 | B1 * | 9/2004 | Sperber | E04F 21/085 406/64 |
| 6,905,238 | B2 * | 6/2005 | Albright | B01F 33/5023 366/314 |
| 6,923,393 | B1 * | 8/2005 | Neier | B01F 33/8305 366/603 |
| 6,945,485 | B1 * | 9/2005 | Douglas | B01F 33/8305 241/101.761 |
| 7,028,932 | B2 * | 4/2006 | Lucas | B01F 27/05 241/101.8 |
| 7,028,933 | B2 * | 4/2006 | Maiz | B01F 33/833 241/101.8 |
| 7,090,441 | B1 * | 8/2006 | Borgman | E04F 21/12 239/651 |
| 7,104,478 | B2 * | 9/2006 | Niemela | E01C 19/20 239/668 |
| 7,207,506 | B1 * | 4/2007 | Dickson, Jr. | A23G 9/045 99/275 |
| 7,566,166 | B2 * | 7/2009 | Neier | B01F 27/70 366/603 |
| 7,712,690 | B2 * | 5/2010 | Johnson | E04F 21/085 241/60 |
| 8,100,578 | B2 * | 1/2012 | Ramhorst | B01F 27/0723 366/320 |
| 8,556,200 | B2 | 10/2013 | Piotrowski et al. | |
| 8,726,608 | B2 * | 5/2014 | O'Leary | E04F 21/085 241/225 |
| 8,740,117 | B1 * | 6/2014 | Zimmerman | A01K 31/04 241/185.5 |
| 8,783,593 | B2 * | 7/2014 | Peterson | B02C 18/2216 241/242 |
| 9,420,759 | B2 * | 8/2016 | Aton | A01K 5/002 |
| 9,457,355 | B2 * | 10/2016 | Conrad | B02C 23/18 |
| 9,592,482 | B2 | 3/2017 | Piotrowski et al. | |
| 9,604,387 | B2 * | 3/2017 | Dooley | D21B 1/061 |
| 10,272,440 | B2 * | 4/2019 | Lietaer | B02C 18/146 |
| 10,603,672 | B2 * | 3/2020 | Piotrowski | B02C 23/20 |
| 2004/0255492 | A1 * | 12/2004 | White, III | E01H 5/04 37/244 |
| 2005/0123385 | A1 * | 6/2005 | Kirsch | B65G 47/18 414/575 |
| 2005/0241190 | A1 * | 11/2005 | Kettering | E01H 5/04 37/258 |
| 2006/0108464 | A1 * | 5/2006 | Rus | B01F 27/921 366/314 |
| 2006/0169811 | A1 * | 8/2006 | Kim | B02C 19/22 241/260.1 |
| 2007/0251120 | A1 * | 11/2007 | Connell | F26B 17/105 34/586 |
| 2010/0090043 | A1 * | 4/2010 | Hoovestol | A01F 29/005 241/185.5 |
| 2010/0108794 | A1 * | 5/2010 | Tamminga | A01K 5/004 366/314 |
| 2010/0150652 | A1 * | 6/2010 | Johnson | E01C 23/06 404/108 |
| 2011/0198426 | A1 * | 8/2011 | Piotrowski | E04F 21/085 241/154 |
| 2013/0008987 | A1 * | 1/2013 | Peterson | B27L 11/002 241/79 |
| 2013/0291411 | A1 * | 11/2013 | Cmich | E01H 5/045 37/251 |
| 2013/0291412 | A1 * | 11/2013 | Cmich | E01H 5/098 37/251 |
| 2014/0010039 | A1 | 1/2014 | Piotrowski et al. | |
| 2014/0147207 | A1 * | 5/2014 | Parsons, Jr. | E01C 23/065 404/91 |
| 2016/0340847 | A1 * | 11/2016 | Eavenson, Sr. | E01H 5/096 |
| 2017/0128950 | A1 * | 5/2017 | Dueck | B02C 23/16 |
| 2017/0138067 | A1 * | 5/2017 | Piotrowski | B01F 27/1121 |
| 2018/0112419 | A1 * | 4/2018 | Zabransky | B02C 18/22 |
| 2018/0186032 | A1 * | 7/2018 | Baumer | B28C 7/165 |
| 2020/0188927 | A1 * | 6/2020 | Piotrowski | B02C 19/22 |

* cited by examiner

SYSTEM, METHOD, AND APPARATUS FOR PROCESSING FIBER MATERIALS

CROSS-REFERENCE TO RELATED APPLICATIONS

The present application is a continuation of and claims priority to U.S. patent application Ser. No. 15/420,920, entitled "SYSTEM, METHOD AND APPARATUS FOR PROCESSING FIBER MATERIALS," filed on Jan. 31, 2017, by Tony S. Piotrowski et al., which is a divisional of and claims priority to U.S. patent application Ser. No. 14/023,732, entitled "SYSTEM, METHOD AND APPARATUS FOR PROCESSING FIBER MATERIALS," filed on Sep. 11, 2013, by Tony S. Piotrowski et al., now U.S. Pat. No. 9,592,482, which is a divisional of and claims priority to U.S. patent application Ser. No. 12/981,657, entitled "SYSTEM, METHOD AND APPARATUS FOR PROCESSING FIBER MATERIALS," filed on Dec. 30, 2010, by Tony S. Piotrowski et al., now U.S. Pat. No. 8,556,200, which claims priority under 35 U.S.C. § 119(e) to U.S. Provisional Application No. 61/304,543, entitled "SYSTEM, METHOD AND APPARATUS FOR PROCESSING FIBER MATERIALS," filed on Feb. 15, 2010, by Tony S. Piotrowski et al., all of which are assigned to the current assignee hereof and incorporated herein by reference in their entireties.

BACKGROUND

Field of the Disclosure

This invention relates generally to providing insulation materials for application to and installation in buildings or other structures and, in particular, to an improved system, method and apparatus for the economical and efficient application of particulate insulation materials from bales or bags of insulation to the surfaces of buildings or other structures by processing and pneumatically blowing or spraying such materials.

Description of the Related Art

Insulation materials such as fibers of granulated rock wool, granulated mineral fiber wool, glass fiber materials, cellulose fibers, expanded mica, etc., may comprise a particulate form. They are typically either blown dry or sprayed through a nozzle with a liquid to form an insulating and sealing coating on a surface. These materials are blown on conventional walls, attics and ceilings in places of habitation or working areas, but also may be sprayed on any other surface as desired.

The insulation material used in conventional insulation spraying and blowing machines is usually in a relatively loose condition. However, it is packed under high compression in bales, bags or sacks for shipment to the user. Upon being opened, the bales or bags are typically manually placed into the receiving hopper of the insulation spraying and blowing machine. The compressed masses of insulation material normally would render the insulation material difficult to use in a conventional apparatus that requires feeding through an air hose to a dispensing nozzle. To reduce the masses of insulation, which may include nodules of material, separation into particulate form must be performed. To some extent the insulation material may be entwined rather than discreet in form. The particulate may include not only particles but also intertwined or overlapping fibers.

To apply insulation materials not only in particulate form but also economically and efficiently, the desirable insulation blowing apparatus would be on a wheeled vehicle for convenience and economy of application. This necessitates a near continuous supply of insulation filled bags with the insulation being emptied into the hopper of the insulation blowing machine.

Accordingly, some commercial hoppers are quite large and operate to fill machines with a series of material separation and movement devices for sequentially chopping, mixing and churning the material, which significantly increases the overall size and complexity of the machine. In contrast, small volume machines have hoppers with minimal capacity and require continuous attention. Small machines also require the insulation to be broken up into smaller pieces for introduction into the feeding hoppers. Moreover, all small machines are electric and do not have their own power supply, with many requiring a dual electric circuit to provide power to their chopper and blower. An improved design for processing and distributing insulation would be desirable.

SUMMARY OF THE INVENTION

Embodiments of a system, method and apparatus for processing material are disclosed. For example, an embodiment of an apparatus for processing material comprises a power supply and a machine powered by the power supply and having a hopper for receiving and passing material to an auger. The auger has a shaft with an axis about which it rotates, a helical flighting mounted to the shaft, pins mounted to the helical flighting, and paddles mounted to the shaft.

In some embodiments, the radial outer edge of the helical flighting is crenelated with periodic notches that form rectangular blades on the helical flighting. The pins are rotationally and angularly aligned with leading edges of the rectangular blades, and extend radially beyond the helical flighting. The axial end of the helical flighting forms a distal edge that may be rotationally aligned with at least one of the paddles.

Embodiments also comprise a system for processing insulation material, including a vehicle, such as a trailer, having first and second compartments separated by a partition. The power supply is located in the first compartment and has a power supply member extending though the partition. The machine is located in the second compartment and coupled to the power supply member.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION

Figure 1:
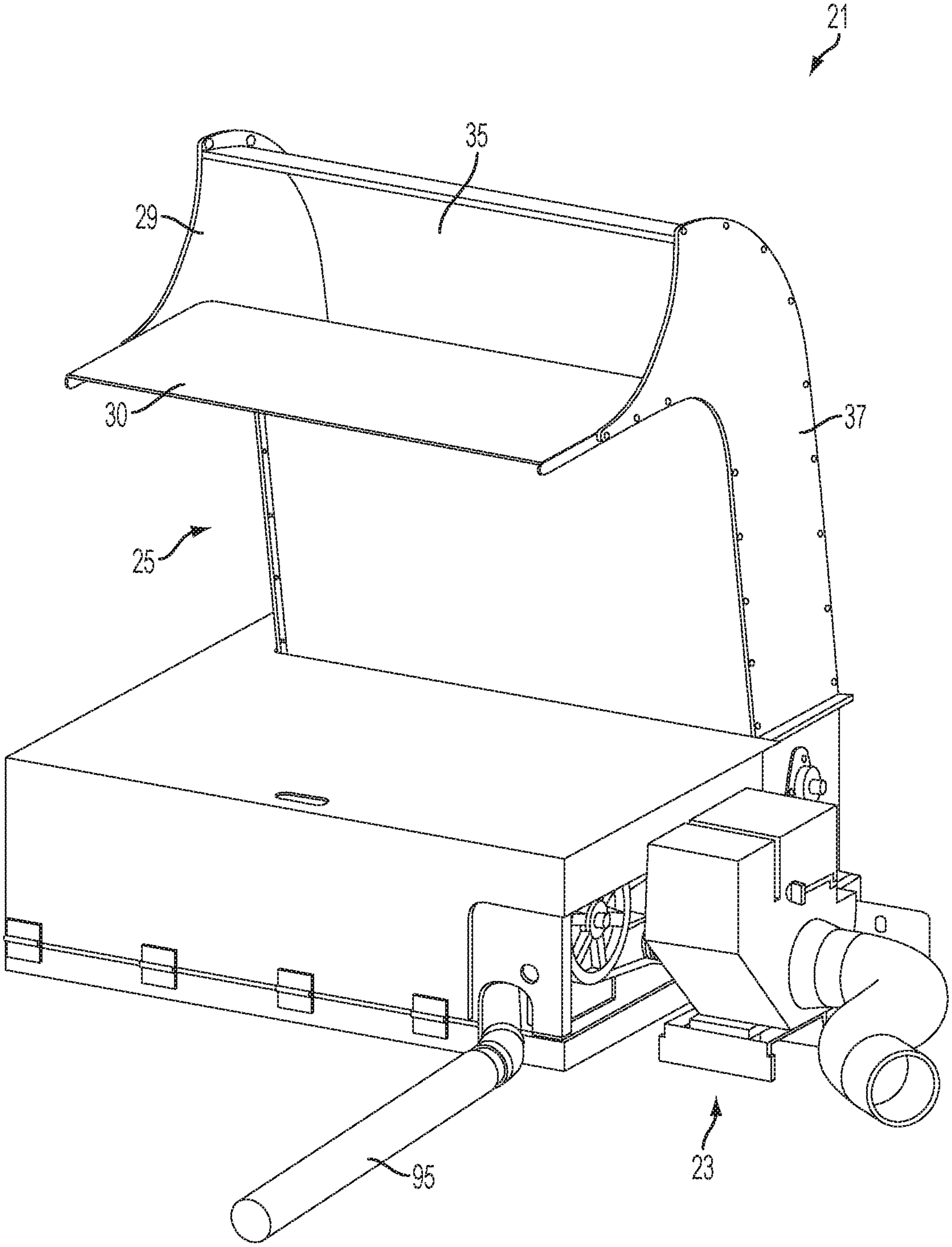
FIG. 1 is a front isometric view of one embodiment of an insulation processing apparatus.
Figure 2:
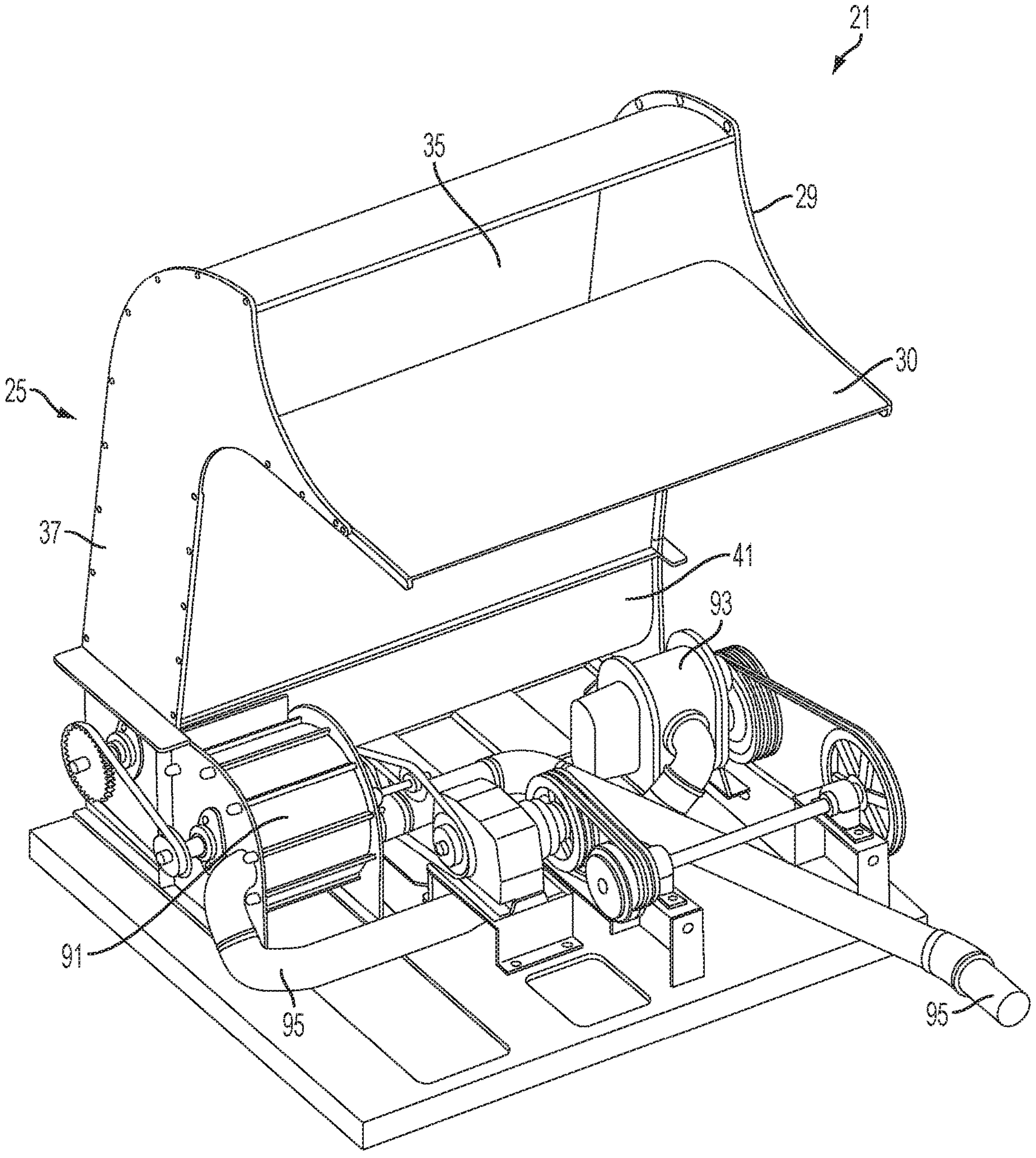
FIG. 2 is another isometric view of a portion of another embodiment of the apparatus, shown with a cover removed.
Figure 3:
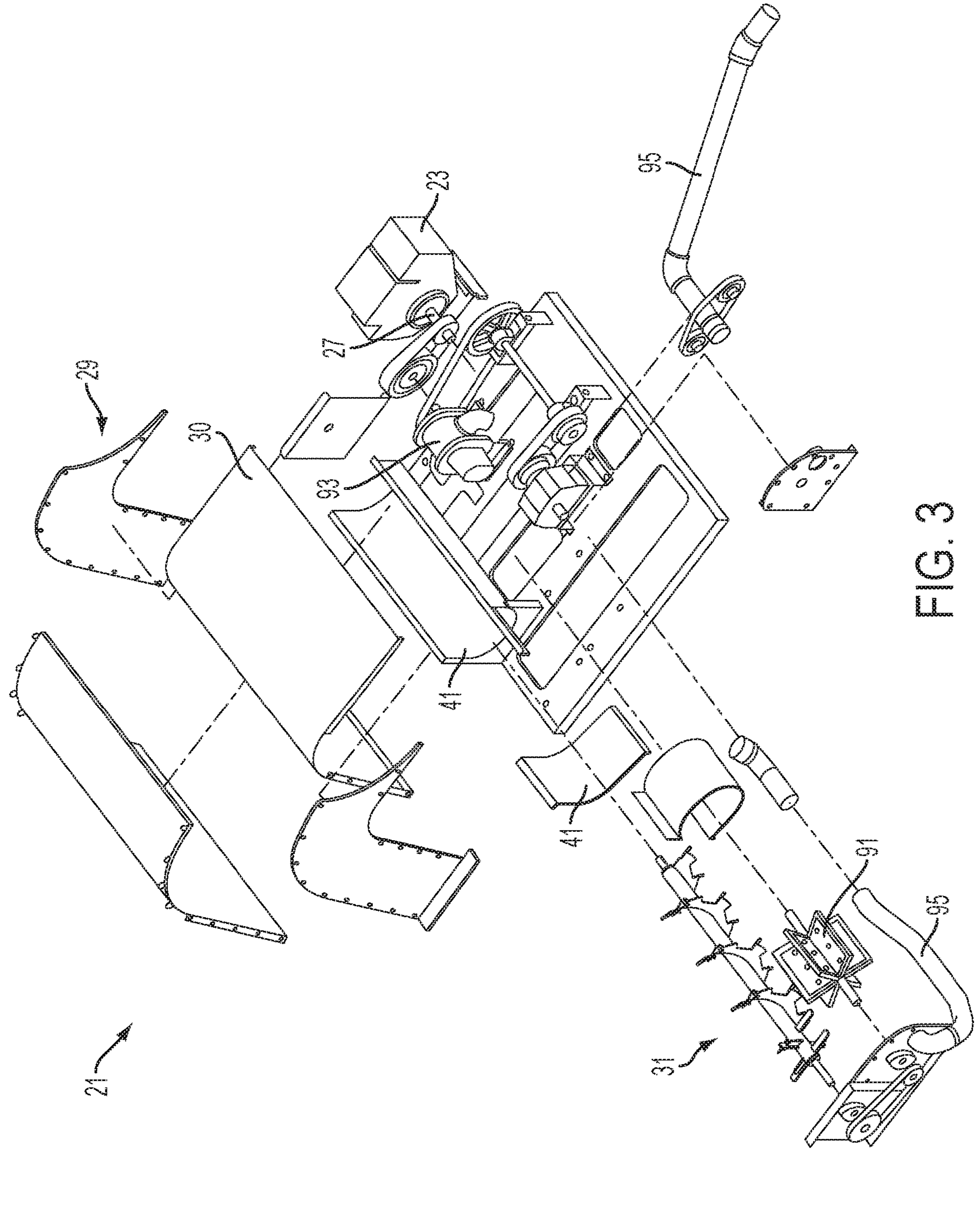
FIG. 3 is an exploded isometric view of another embodiment of the apparatus.

FIGS. 1-12 disclose embodiments of a system, method and apparatus for processing material. For example, as shown in FIGS. 1-3, the apparatus 21 may comprise a power supply 23 and a machine 25 that is coupled to and powered by the power supply 23 for processing insulation materials. In the embodiment shown, the power supply 23 comprises an internal combustion engine that is coupled to the machine 25 via a drive shaft 27 (FIG. 3). In other embodiments, however, the power supply 23 may comprise other types of mechanical or electrical power generators. The power supply 23 may be coupled to the machine 25 via various means such as the pulleys, belts, shafts and gears depicted, as is known to those of ordinary skill in the art.

The machine 25 has a hopper 29 for receiving and passing material to an auger 31 (FIG. 3) that rotates within the machine 25. The hopper 29 may be provided with a horizontal platform 30 for supporting a bale, sack or bag of material 33 (see, e.g., FIG. 9). In the embodiment shown, the hopper 29 has a capacity of approximately 1.5 bales and passes the material directly to the auger 31 by gravity. The hopper 29 has a generally rectangular opening 35 (FIG. 1) that is configured to and slightly larger than the profile of the bale 33 of material to limit the intake of material. The horizontal platform 30 transitions to a substantially vertical chute 37 downstream from the opening 35. The vertical chute 37 is located directly over a portion of the auger 31.

Figure 4:
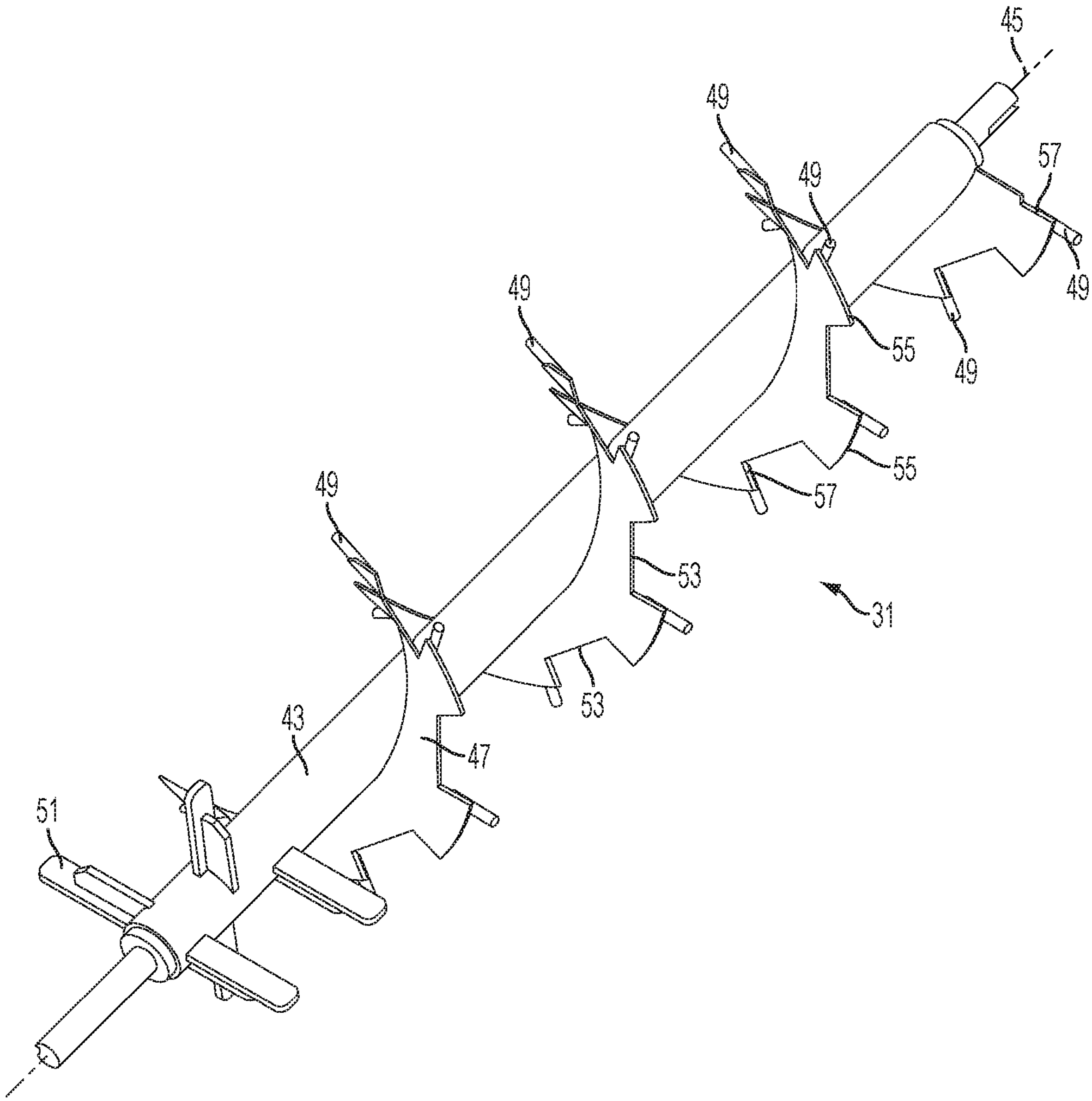
FIG. 4 is an isometric view of an embodiment of an auger for the apparatus.
Figure 5:
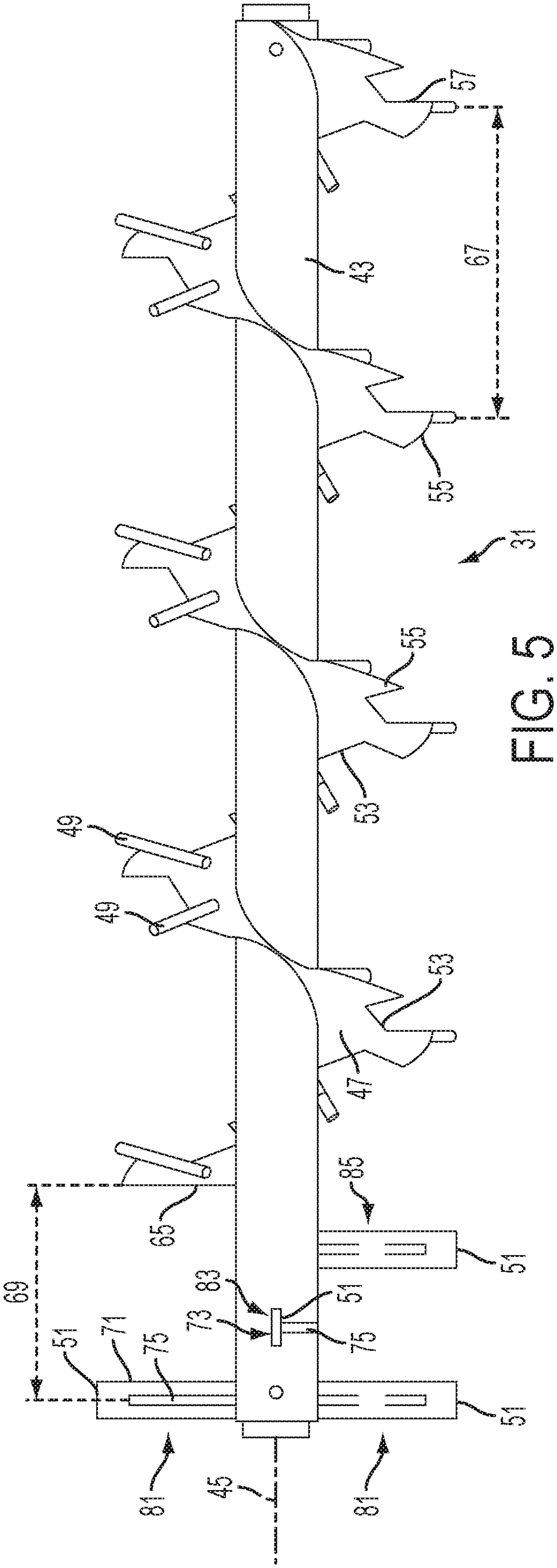
FIG. 5 is a side view of an embodiment of an auger.
Figure 6:
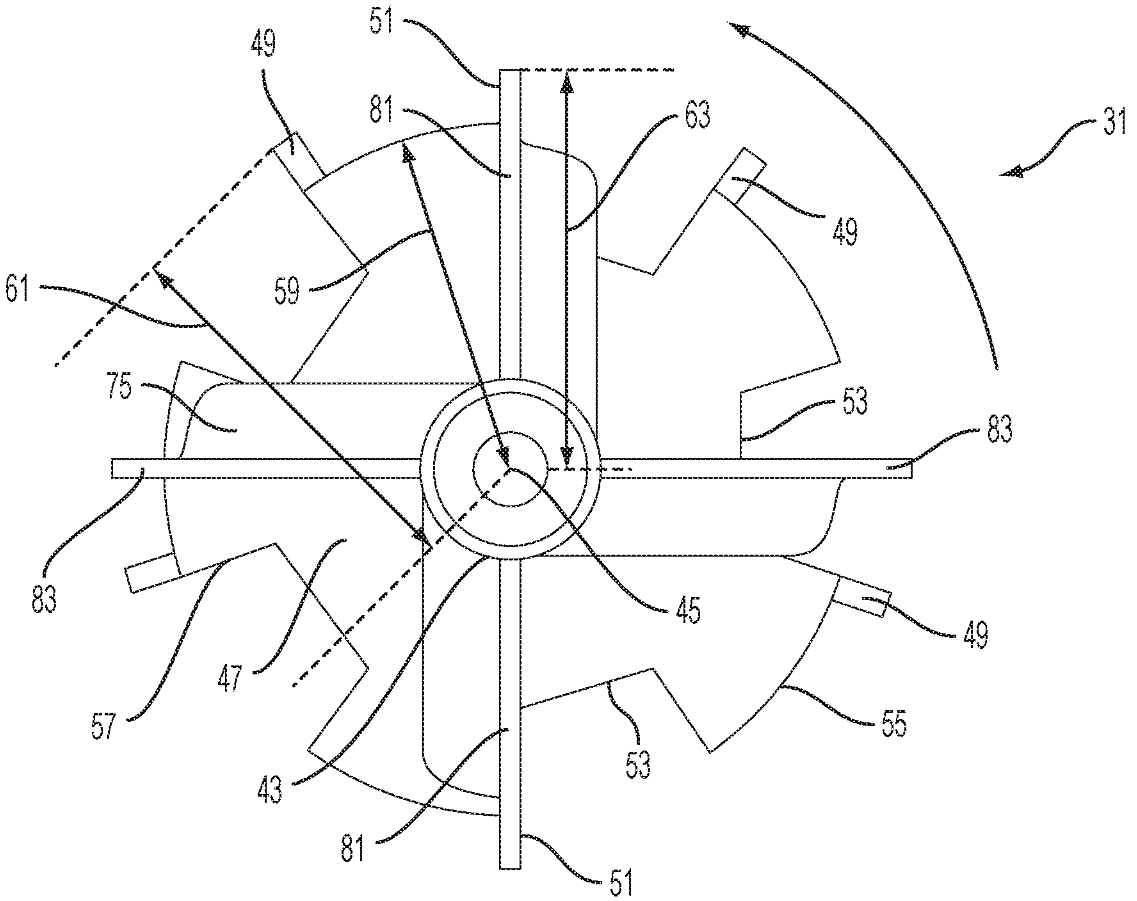
FIG. 6 is an end view of an embodiment of an auger.

In the illustrated embodiment, the auger 31 is located in a trough 41 (FIGS. 2 and 3) and coupled to and rotated by the power supply 23 without contacting the surfaces of the trough 41. As best shown in FIGS. 4-6, the auger 31 comprises a shaft 43 with an axis 45 about which the auger 31 rotates. In the embodiment shown, a single spiral or helical flighting 47 (e.g., a helix) is mounted to the shaft. Pins 49 are mounted to the helical flighting 47, and a series of paddles 51 are mounted to the shaft 43.

The embodiment shown depicts a radial outer edge of the helical flighting 47 being crenelated or castellated with periodic notches 53 that form generally rectangular blades 55 on the helical flighting 47. The pins 49 are rotationally and angularly aligned with the leading edges 57 of the generally rectangular blades 55. The pins 49 extend radially beyond the radial outer edge of the helical flighting, such that the radial outer edge has a shorter radial length 59 (FIG. 6) than a pin radial length 61 of pins 49 relative to the axis 45. The pins 49 have distal ends that define the pin radial length 61 relative to the axis 45. The paddles 51 have distal ends that define a paddle radial length 63 relative to the axis 45, and the pin and paddle radial lengths 61, 63 are equal in some embodiments.

Embodiments of an axial end 65 (FIG. 5) of the helical flighting 47 form a distal edge thereof that is rotationally aligned (e.g., at the 12 o'clock position in FIG. 6) with at least one of the paddles 51 (e.g., one paddle 51 in the embodiment shown). The distal edge 65 extends in a radially orthogonal direction relative to the axis 45. In addition, the helical flighting 47 has an axial pitch 67 (FIG. 5) that is cyclical and defines an axial length. The distal edge 65 of the helical flighting 47 is spaced apart from the one aligned paddle 51 by an axial distance 69 that is less than the axial pitch 67. In some embodiments, the helical flighting 47 has at least three axial pitches.

Again referring to the embodiment of FIG. 5, each paddle 51 comprises a plate 71 with a surface 73 that is flat, elongated and rectangular. Each plate 71 protrudes radially from the shaft 43 such that the surface 73 is parallel to the axis 45. Each plate 71 also is supported by a support bracket 75 extending from the shaft 43.

In some embodiments, the paddles 51 comprise a first set 81 (FIGS. 5 and 6) of two paddles 51 at an axial end of the shaft 43. The first set 81 is rotationally opposed (e.g., at the 12 and 6 o'clock positions) to each other relative to the axis 43. A second set 83 of two paddles 51 are axially spaced apart from and rotationally orthogonal to the first set 81. The second set 83 also is rotationally opposed to each other at, for example, the 3 and 9 o'clock positions. A single paddle 85 is axially spaced apart from and rotationally orthogonal to the second set 83 and axially opposite the first set 81. The single paddle 85 rotationally aligns with one of the two paddles 51 of the first set 81 (e.g., at the 6 o'clock position).

In operation (FIG. 9), the bale 33 is opened and any packaging material or binding for the material is discarded. The material is put in hopper 25 and moved by the operator from the platform through opening 35 and falls through vertical chute 37 onto the rotating auger 31. The whirling helical flighting 47 and pins 49 pick apart the insulation material and axially propagate or push it right to left (in the illustrated embodiment) toward paddles 51. Thus, only some of the insulation material entering through the hopper 25 makes immediate contact with paddles 51. Paddles 51 then push the separated material away from the auger 31 out of the trough 41 and into a feeder 91 (FIGS. 2 and 3) having an airlock for maintaining pneumatic pressure in the system. A blower 93 provides air pressure to feeder 91 and propels the separated material through hoses 95 for delivery to and installation in a building or the like, as is known by those of ordinary skill in the art.

Figure 7:
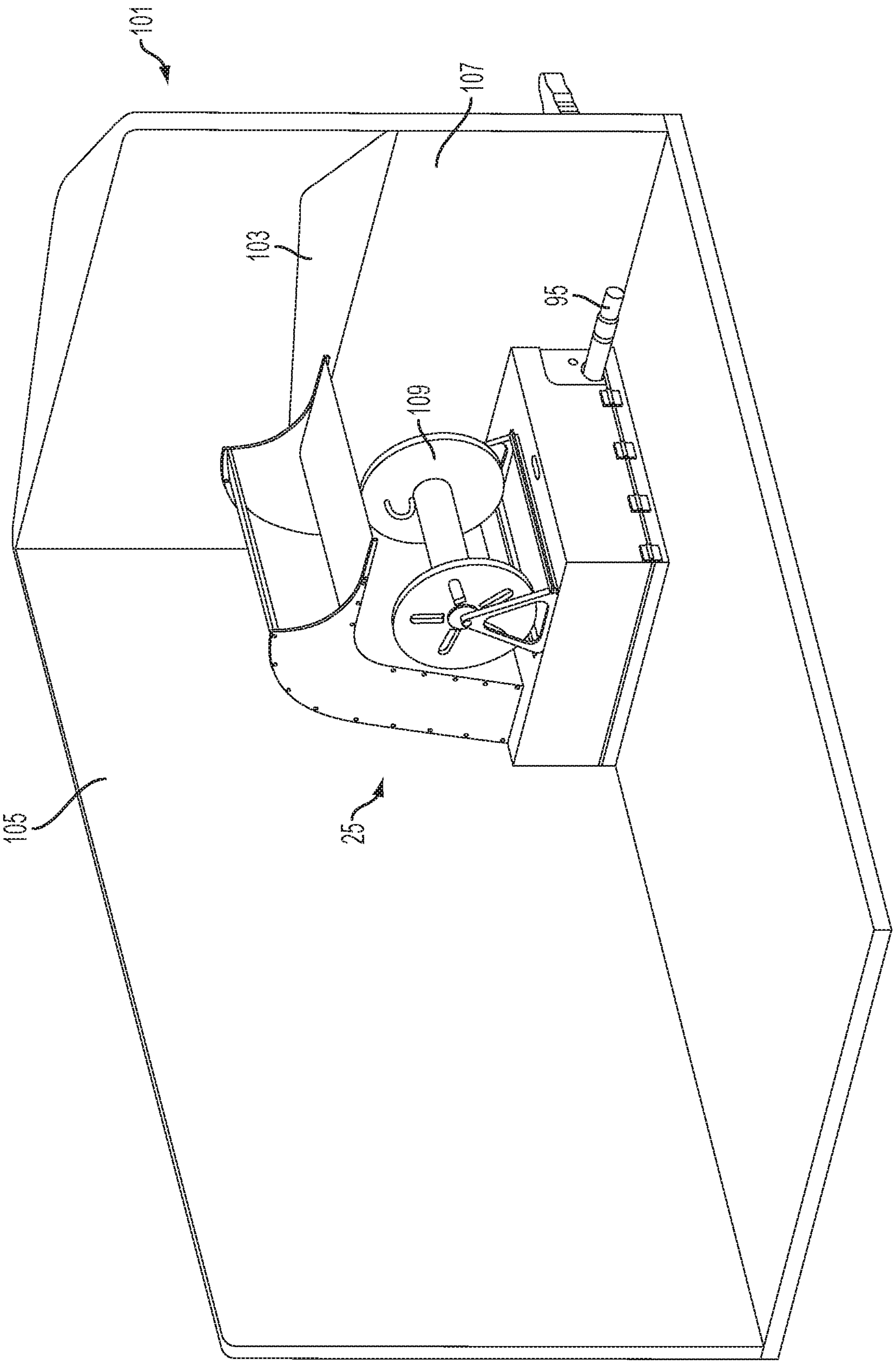
FIG. 7 is an isometric view of another embodiment of the apparatus, shown installed in a trailer (with some walls removed for illustration purposes)
Figure 8:
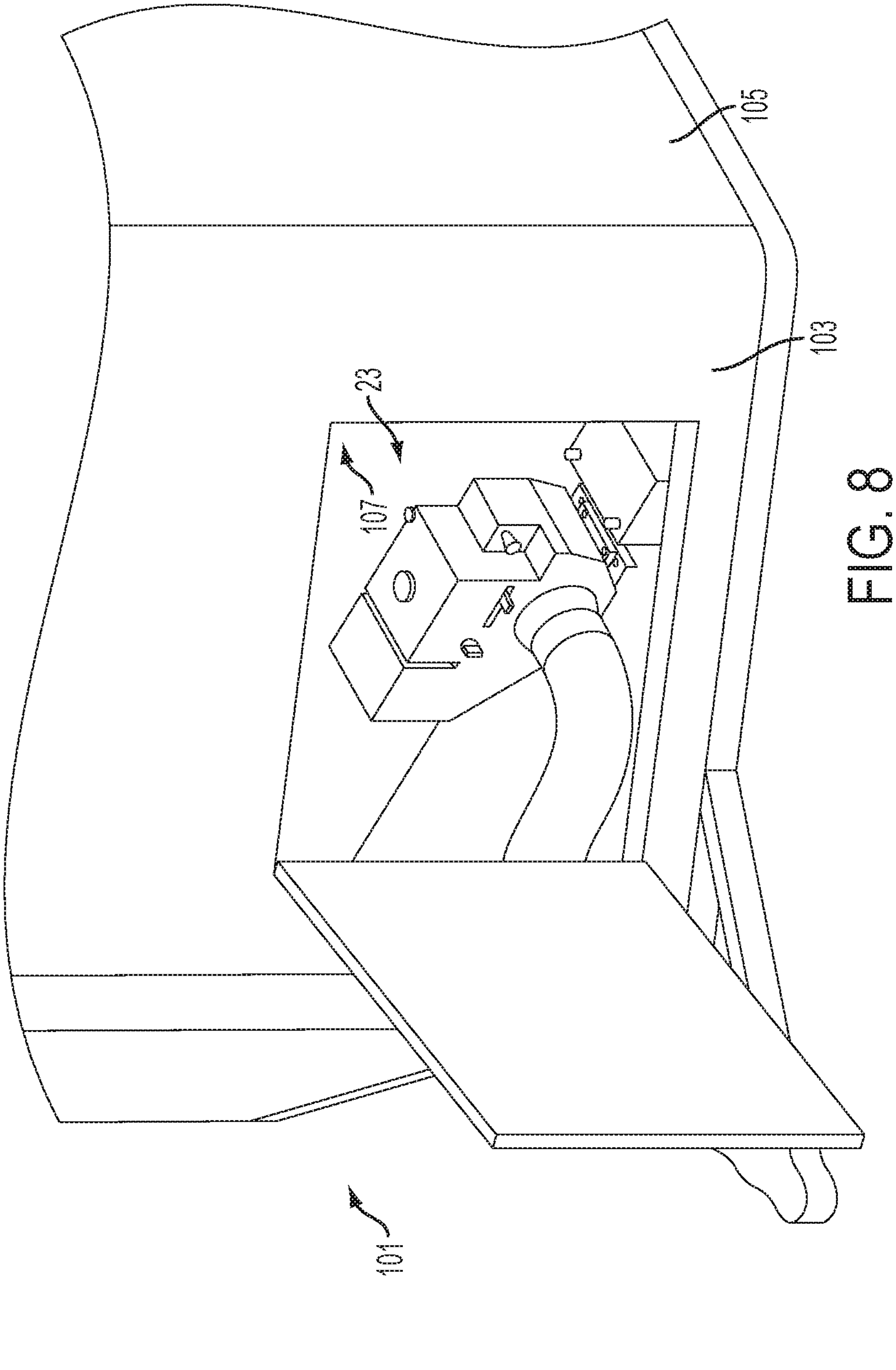
FIG. 8 is a front isometric view of an embodiment of a power supply for the apparatus installed in a compartment of a trailer.
Figure 9:
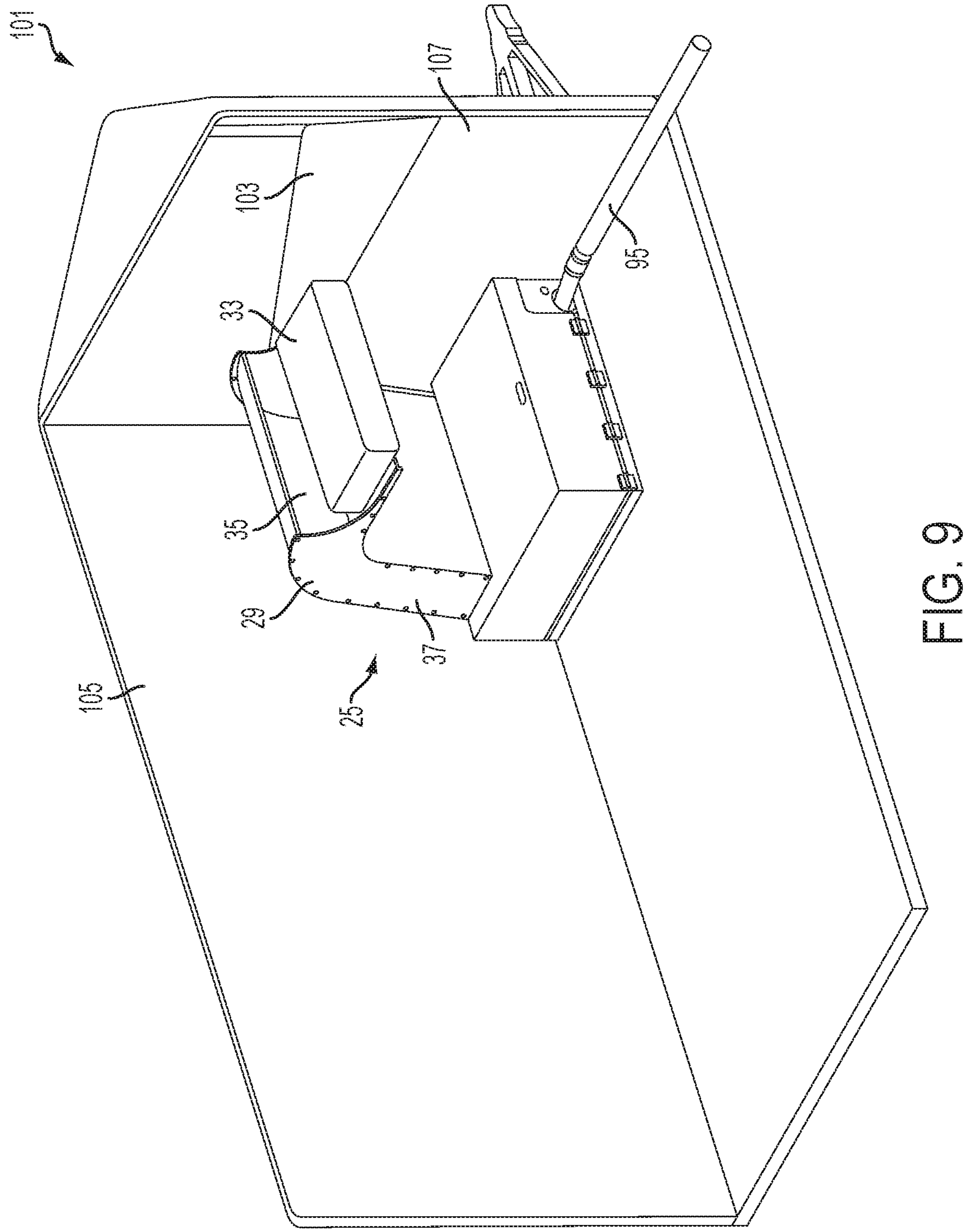
FIG. 9 is an isometric view of another embodiment of the apparatus, shown installed in a trailer and with a bale of insulation material.

Referring now to FIGS. 7-9, some embodiments comprise a system for processing insulation material. For ease of transportation, a vehicle 101 (e.g., a utility tow trailer, or mid-size box truck or van), has first and second compartments 103, 105 separated by a partition 107. The power supply 23 is located in the first compartment 103 and has a power supply member (e.g., drive shaft) extending though the partition. In other embodiments, only the drive shaft extends through the partition 107, which is sealed to avoid exposing the operator in compartment 105 to the noise, heat and fumes generated by the power supply 23.

The machine 25 may be located in the second compartment 105, coupled to the power supply member and operates as described herein. In FIG. 7, the machine 25 has an optional spool 109 for coiling the hose 95. In some embodiments, the first and second compartments 103, 105 are completely separated interior compartments within the vehicle or trailer 101. The partition 107 may comprise a solid insulated wall that completely separates and isolates the first and second interior compartments 103, 105.

Figure 10:
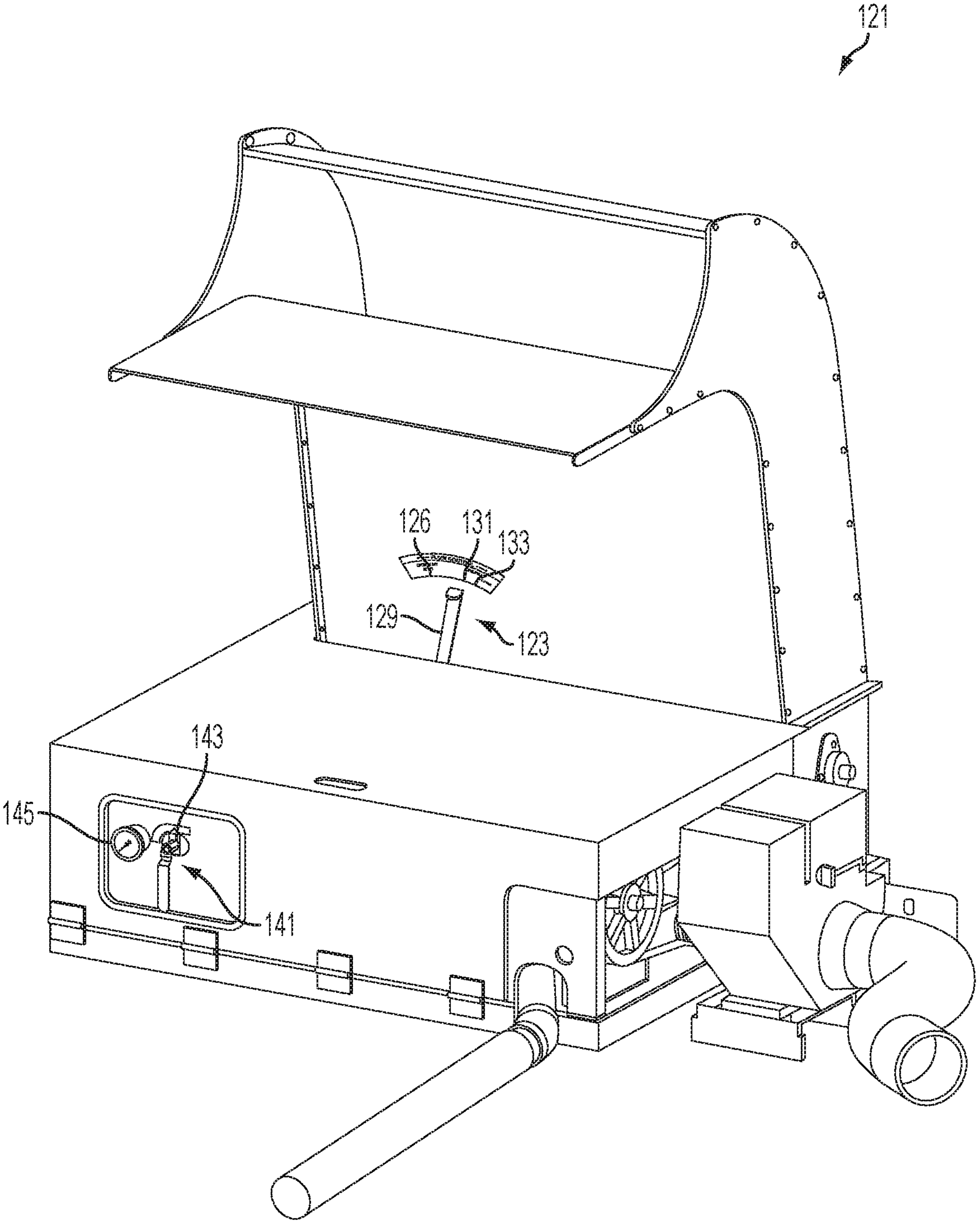
FIG. 10 is an isometric view of an alternate embodiment of the apparatus.
Figure 11:
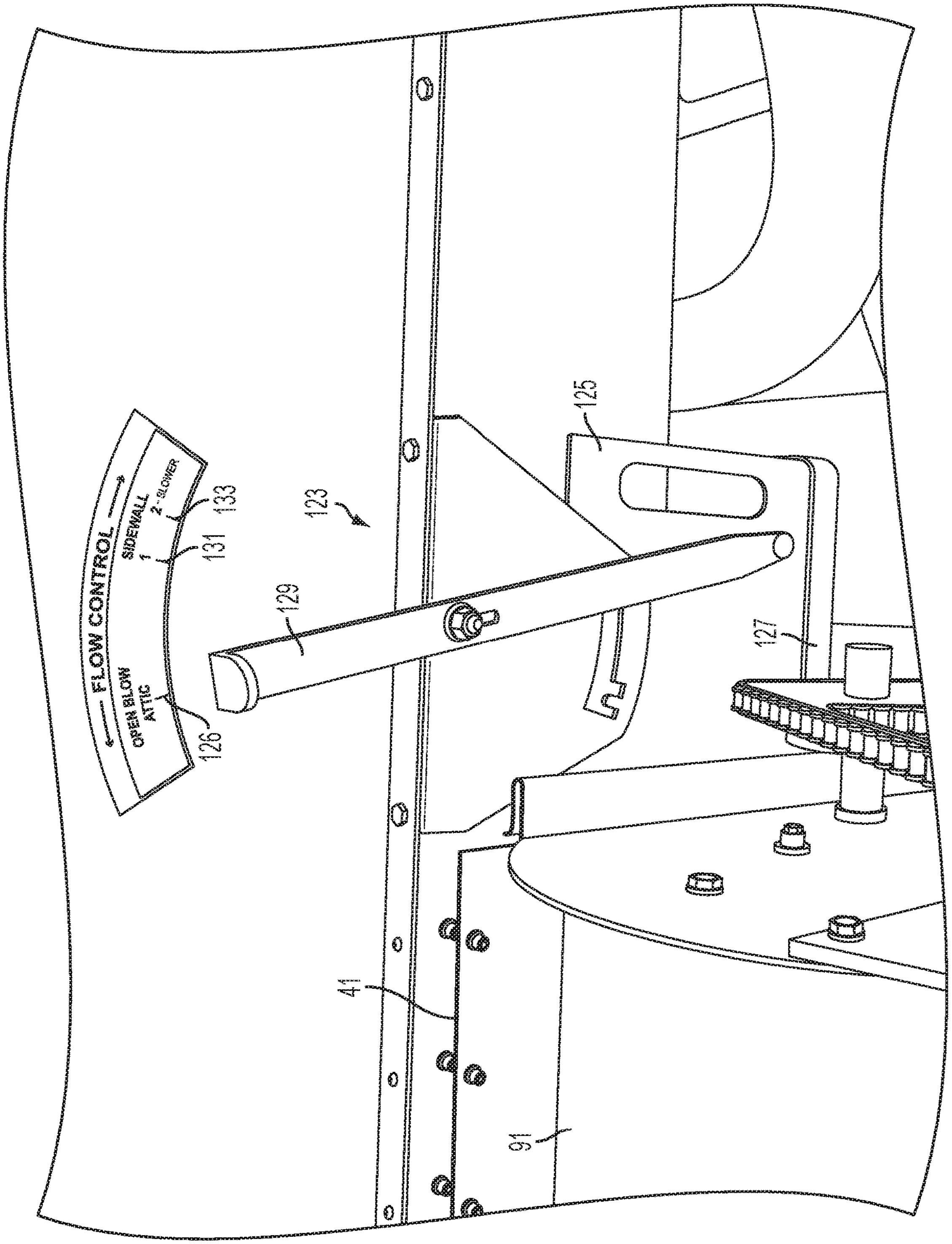
FIGS. 11 and 12 are enlarged front views of different portions of the apparatus of FIG. 10.
Figure 12:
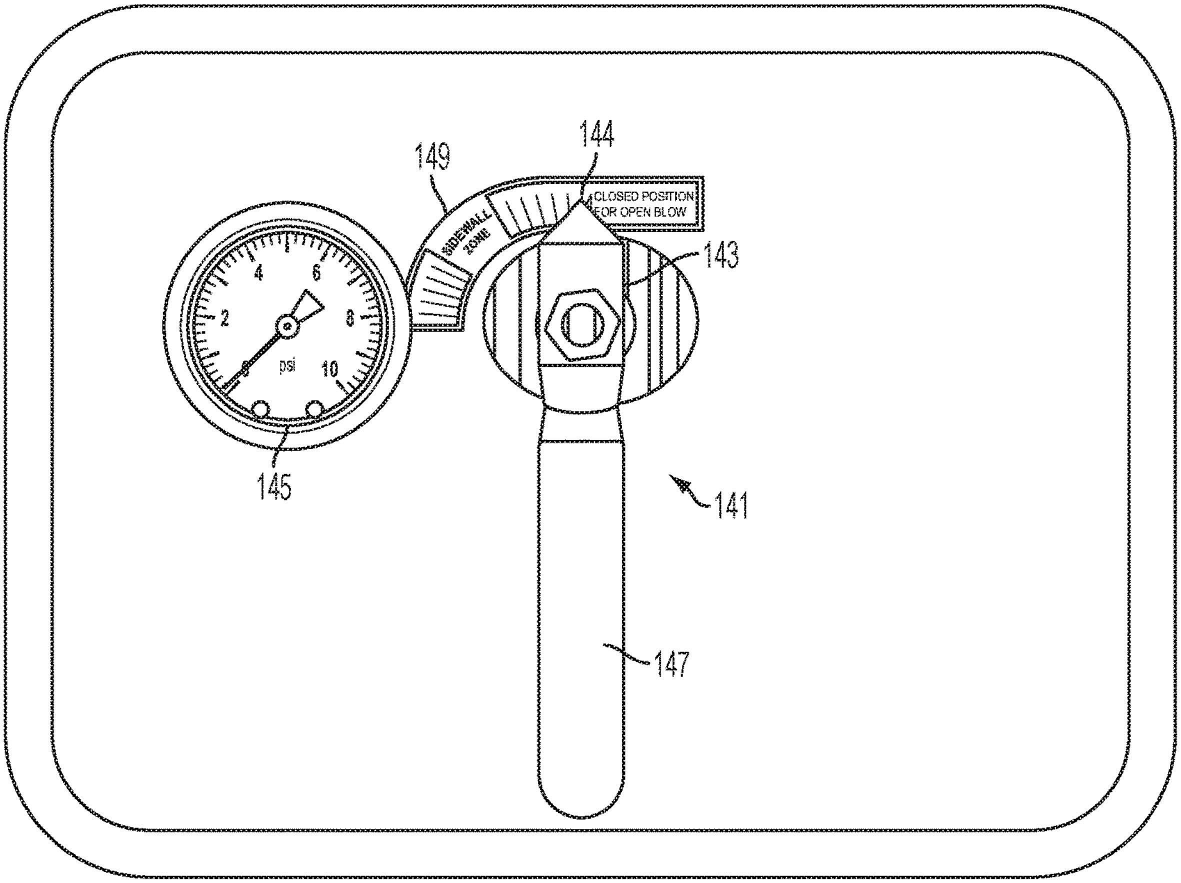

Referring now to FIGS. 10-12, an alternate embodiment of the apparatus 121 is shown. Apparatus 121 may employ any of the features, elements and components disclosed herein, and may be incorporated into the systems as described herein. Apparatus 121 further employs features that adjust the amount of material and air pressure utilized to perform some types of operations. The features allow the apparatus to adapt to different types of material applications, such as open blow attic or sidewall applications for the material.

For example, as shown in FIGS. 10 and 11, apparatus 121 has a material flow rate adjustment system 123 that is manually adjustable to vary the size of the opening between the distal end of the trough 41 and the feeder 91 or airlock. In the embodiment shown, material flow rate adjustment system 123 has a slide gate 125 that is horizontally movable (left and right in FIG. 11) within a lower channel 127. Effectively, slide gate 125 is a thin door that regulates the size of the aperture and material flow rate of material from trough 41 to feeder 91. Slide gate 125 is operated by a lever 129 that can position slide gate 125 for maximum material flow (e.g., "open blow attic" position 126). This position 126 is depicted in FIG. 11. The lever 129 may be lifted slightly and moved to the right, thereby pivoting and moving or sliding slide gate 125 to the left. These positions reduce the amount of material entering feeder 91. In the embodiment shown, there are two, lower material flow rate positions 131 and 133. In FIG. 10, lever 129 is shown in the lowest material flow rate position 133. The lever 129 and material flow rate adjustment system 123 are provided with features such as pins and detents to facilitate movement and locking of each of these positions, as is known to those of ordinary skill in the art.

As shown in FIGS. 10 and 12, apparatus 121 also may be provided with an air bleed system 141 comprising a manually-operated valve 143 and air pressure gage 145. Operation of the air bleed system 141 may be used in conjunction with the material flow rate adjustment system 123 to suitably adjust the overall operation of the apparatus for the desired application, such as open blow attic or sidewall applications.

In the embodiment of FIG. 12, the handle 147 of valve 143 is vertical and in a closed position 144 for maximum air flow pressure. This is suitable for open blow attic applications. Accordingly, the needle of gage 145 is at zero, which shows no loss or "bleed" in the air pressure from the system. The air flow pressure in the system may be reduced by intentionally losing or "bleeding" some of the air pressure. Reducing the air pressure in the system is suitable for applications such as sidewall material installations. In the illustrated embodiment, the air pressure may be reduced by rotating handle 147 counter-clockwise to partially open valve 143, such as to sidewall zone 149 (FIG. 12). Such movement of the valve will correspond in gage 145 showing the amount of air pressure that is being bled from the system.

The invention has numerous advantages. An insulation machine installation system in accordance with the invention is self-supported by its own power supply and may be mounted in a trailer or van. The design is a simple, less expensive system for installing loose fill insulation that is transported by or in a conventional trailer, truck or van.

Unlike conventional small capacity machines, the invention does not require the insulation to be broken up into smaller pieces for introduction into the feeding hopper. In contrast, this machine permits full bags to be fed, with the hopper holding a full bag plus the entry of the second bag. This is a significant advantage over small machines.

The power supply, such as a small internal combustion engine, is separated from the machine and operator area to minimize exposure of the operator to the noise, exhaust fumes and elevated temperatures originating from the power supply. The engine is located and started in one compartment, which may be baffled and ventilated, and closed with a door or hatch. Only the drive shaft of the engine extends to the machine. The operator may use a wireless radio remote to control the machine functions. This design improves work environment conditions to users operating the equipment for an extended period of time.

In some embodiments, the small to mid-size insulation machine system is designed to operate out of a mid-size van or enclosed tow utility trailer. The system has a unique design unlike any insulation system currently on the market today with its full single bag feed hopper and its stand alone power supply. Other features include taking the highly compressed fiberglass insulation and processing it with a single material dispersement mechanism. The process also efficiently feeds material into the airlock unlike conventional machines.

This written description uses examples to disclose the embodiments, including the best mode, and also to enable those of ordinary skill in the art to make and use the invention. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

Note that not all of the activities described above in the general description or the examples are required, that a portion of a specific activity may not be required, and that one or more further activities may be performed in addition to those described. The order in which activities are listed is not necessarily the order in which they are performed.

In the foregoing specification, the concepts have been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" are employed to describe elements and components described herein. This is done merely for convenience and to give a general sense of the scope of the invention. This description should be read to include one or at least one and the singular also includes the plural unless it is obvious that it is meant otherwise.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

After reading the specification, skilled artisans will appreciate that certain features are, for clarity, described herein in the context of separate embodiments, may also be provided in combination in a single embodiment. Conversely, various features that are, for brevity, described in the context of a single embodiment, may also be provided separately or in any subcombination. Further, references to values stated in ranges include each and every value within that range.

What is claimed is:

1. A system for processing insulation material, comprising:

a power supply;

a hopper for receiving and passing material to an auger, the auger comprising:

a shaft with an axis about which the auger rotates; and a helical flighting mounted to the shaft, and paddles mounted to an axial end of the shaft, wherein each paddle comprises a plate with a surface that is flat, elongated and rectangular, wherein the paddles extend radially from the shaft, wherein the surface has a surface area greater than any adjacent surface of the paddle, wherein the surface of the plate of each paddle is parallel to the axis of the shaft, and wherein the paddles extends beyond the helical flighting.

2. The system of claim 1, wherein a radial outer edge of the helical flighting is crenelated with periodic notches that form blades on the helical flighting.

3. The system of claim 1, further comprising: a plurality of pins.

4. The system of claim 3, wherein the pins extend radially beyond the helical flighting.

5. The system of claim 1, wherein the auger is located in a trough.

6. The system of claim 1, wherein the hopper comprises a vertical trough.

7. The system of claim 6, wherein the auger is configured to separate insulation material and axially propagate the insulation material.

8. The system of claim 7, wherein the paddles are configured to carry the separated insulation material away from the auger and out of the trough into a feeder.

9. The system of claim 8, further comprising: a blower, wherein the blower is configured to supply air pressure to the feeder and propel the separated insulation material through hoses for delivery to and installation of the separated insulation material into a structure.

10. An auger, comprising:

a shaft with an axis about which the auger rotates;

a helical flighting mounted to the shaft, and paddles mounted to an axial end of the shaft, wherein each paddle comprises a plate with a surface that is flat, elongated and rectangular, wherein the paddles extend radially from the shaft, wherein the surface has a surface area greater than any adjacent surface of the paddle, wherein the surface of the plate of each paddle is parallel to the axis of the shaft, and wherein the paddles extends beyond the helical flighting.

11. The auger of claim 10, wherein a radial outer edge of the helical flighting is crenelated with periodic notches that form blades on the helical flighting.

12. The auger of claim 10, further comprising: a plurality of pins.

13. The auger of claim 12, wherein the pins extend radially beyond the helical flighting.

14. The auger of claim 10, wherein each paddle comprises a plate having a surface that is substantially flat and elongated.

15. The auger of claim 10, wherein at least one of the paddles is aligned with a distal edge of the helical flighting.

16. The auger of claim 15, wherein the distal edge extends in a radially orthogonal direction relative to the axis.

17. The auger of claim 10, wherein the paddles comprise a first set of paddles, a second set of paddles, and a single paddle, wherein the first set of paddles and the second set of paddles are axially spaced apart, and wherein the single paddle is axially spaced apart from each of the first set of paddles and the second set of paddles.

* * * * *